April 13, 1954 P. SCHAURTE 2,674,805
VARIABLE LIMIT COMPARATOR
Filed May 5, 1950 2 Sheets-Sheet 1
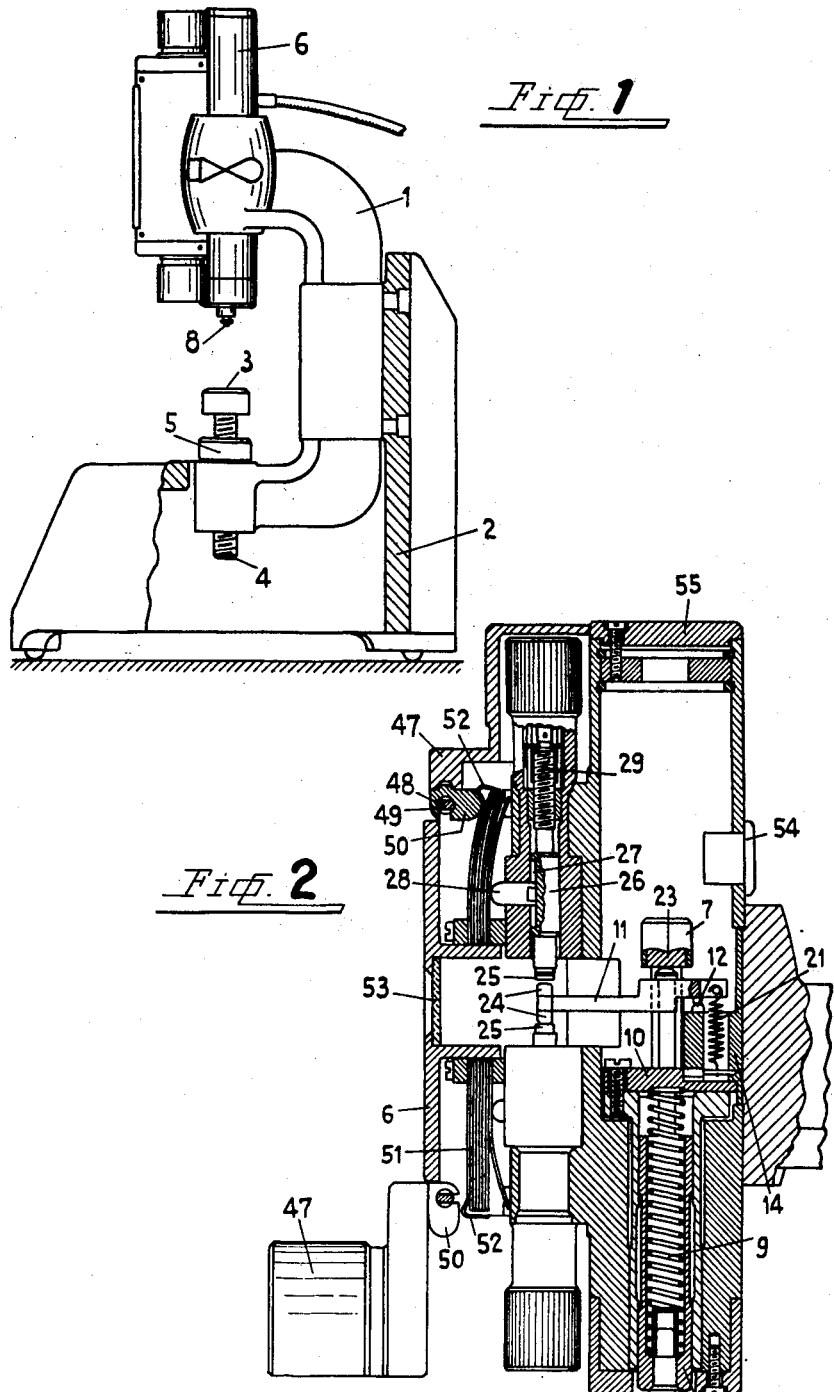

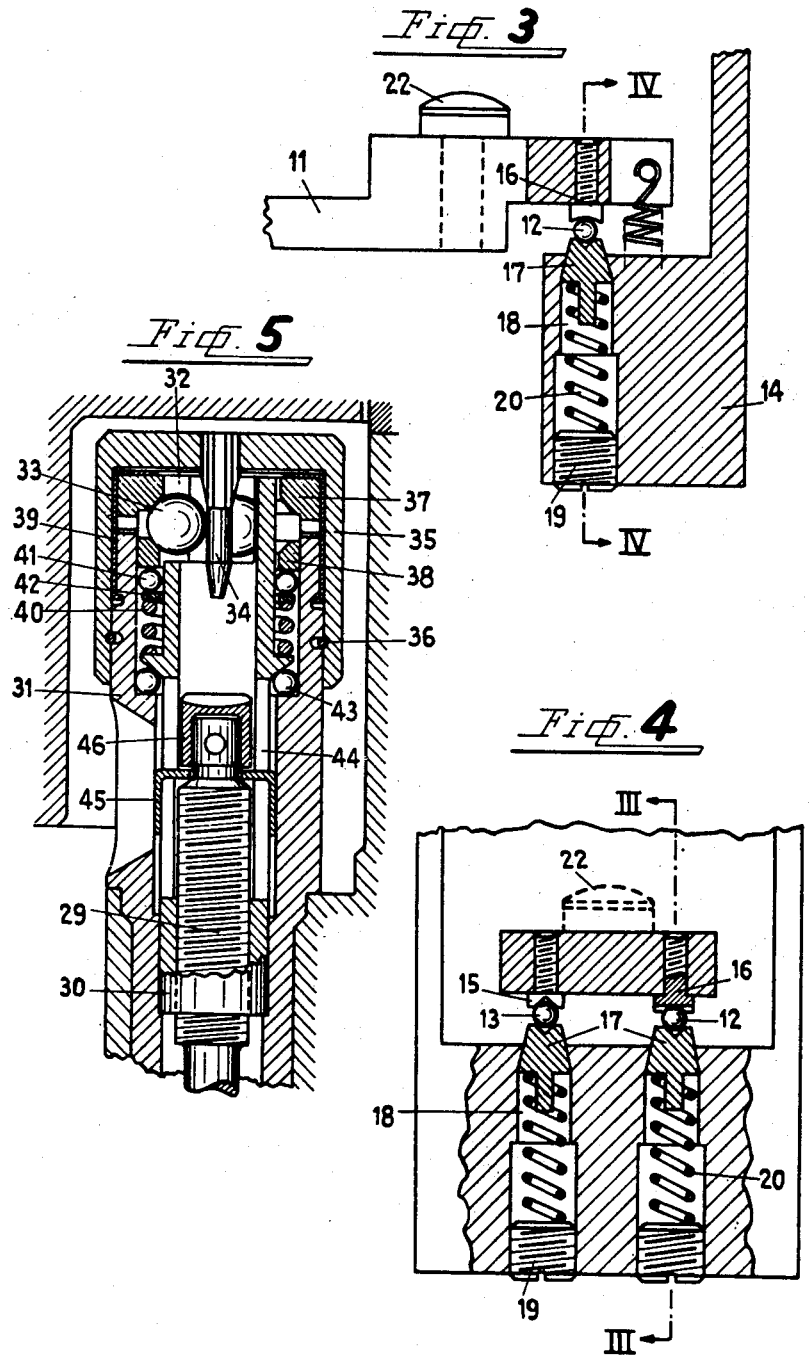

Patented Apr. 13, 1954

2,674,805

UNITED STATES PATENT OFFICE 2,674,805

VARIABLE LIMIT COMPARATOR

Paul Schaurte, Vaduz, Liechtenstein

Application May 5, 1950, Serial No. 160,194

Claims priority, application Switzerland
May 6, 1949

6 Claims. (Cl. 33—147)

This invention relates to comparators for the gauging of geometrical permissible limits of and on workpieces. According to the present invention permissible limits are determined by means of a gauging pin and of electrical contacts cooperating therewith and which, when set into action indicate that the object to be measured is below or above the limits of a range of tolerance. The comparator is mainly characterized by the fact that a pivoting lever which is under the influence of springs, is provided with contact elements which can be moved between two adjustable contact surfaces. The lever against which the gauging pin strikes is connected with the latter in such a manner that an axial displacement of the gauging pin against the action of the spring which operates upon it releases the contact lever which, under the influence of its spring will pivot so that one of its contact elements is lifted off the corresponding contact surface whereas the other one moves towards the other contact surface.

By way of example an embodiment of the object of the invention is illustrated in the drawing accompanying and forming part of this specification in which:

Fig. 1 is a side elevational view of the comparator with the bracket partially broken away, Fig. 2 is a detail of Fig. 1 in vertical, longitudinal section, Fig. 3 is a detail of Fig. 2 on an enlarged scale, partially in section and taken along line III—III of Fig. 4, Fig. 4 is a sectional view taken along line IV—IV of Fig. 3; and, Fig. 5 is a detail of Fig. 2 taken partially in longitudinal section.

The comparator as shown in Fig. 1 consists of a support 1 having the shape of a stirrup which is secured to a bracket 2. The lower shank of the support 1 is provided with a rest surface 3 which is adjustable in its vertical direction by means of a screw spindle 4. A locking nut 5 engages the spindle and prevents the spindle from being unintentionally rotated. The casing 6 is joined to the upper shank of the support 1 and contains, as shown in Fig. 2, a gauging pin 7 which can be moved in the axial direction. The lower end of this gauging pin is provided with an interchangeable gauging element 8 and contains, housed in a longitudinal bore, a helical spring 9. One end of the spring touches the gauging pin while the other end bears against a stop 10, thus biasing the gauging pin downwards. The upper part of the gauging pin is provided with two longitudinal slots extending in an axial plane which coincides with the plane of projection of Fig. 2 and through which the stop 10 projects. A contact lever 11 is also passed through these longitudinal slots and rests near one of its extremities on two balls 12 and 13, as is clearly shown in Figs. 3 and 4. Each of the balls rests on two seats, one of which is secured to the contact lever 11 while the other is attached to a part 14, the latter being secured rigidly to the casing 6. The bearing 15 attached to the contact lever is provided with an inverted conical seat, while the other bearing 16 has a concave-cylindrical seat, whose cylinder elements are parallel to the pivoting axis of the contact lever. The two bearings 17 which are attached to the fixed part 14 are both provided with cylindrical seats and are resiliently supported in the axial direction, i. e. in the direction of the pressure of bearing. For this purpose, the bearings 17 are given the shape of truncated cones and are inserted into bores 18 of the fixed part 14. These bores are tapered off in the direction of the contact lever, thus preventing the bearings 17, which are inserted from the other side of the bore, from shifting out of the bores 18 towards the contact lever. Each of the bearings 17 is pressed against the stops formed by the tapering of the bores 18 by a helical spring 20 which can be tensioned by means of a screw bolt 19. The strength of these springs 20 is such that the resilience of the bearing will only become effective when the bearing is overloaded. Biasing means in the form of a spring 21 which is fastened to the shorter arm of the contact lever 11 exerts a tension effect on the lever in such a manner as to turn the lever in a clockwise direction in Fig. 2. The longer arm of the contact lever 11, however, is provided with a surface 22 in the shape of a spherical cap which is situated near the pivoting axis of the lever and preferably fabricated of hard metal. Stop surface 22 bears against a stop 23 situated at the upper end of the gauging pin 7 which likewise is preferably made of hard metal.

The free end of the longer arm of the contact lever 11 is provided on both sides with contact elements 24, made preferably of hard metal. These contact elements are opposed by fixed contact surfaces 25 which can be adjusted in the vertical direction and are made of hard metal. Each of contact surfaces 25 is attached to a spindle 26 which can be displaced in the vertical direction but cannot be rotated. The attachment is effected in such a manner that the contact elements are insulated electrically from the spindles.

Each of the spindles 26 is provided with a longitudinal slot 27 into which a bolt 28 projects, the latter being arranged radially of the spindle. The ends of the spindles 26 remote from the contact surfaces 25 are provided with threads 29 serving to secure a screw bushing 30 thereto. This screw bushing is pivotally mounted in a part 31 which is attached to the casing 6. The part 31 is provided at its outer end with three longitudinal slots 32 which are angularly spaced by 120 degrees. The slots 32 contain balls 33 which exert a radial pressure on a pin 34 which is pressed centrally into a bushing 35. This bushing 35 is freely rotatably mounted on part 31 by means of an expanding ring 36 which is inserted into ring grooves that are provided in both parts and prevents the bushing 35 from shifting out of its bearing. In the other direction the balls 33 exert pressure on two rings 37 and 38 which are provided with conical surfaces. The ring 37 is held by a bushing 39 which is fixed by the flanging of its edge while the other ring 38 is pressed against the ring 37 by a spiral spring 40. Balls 41 and a thrust ring 42 are interposed between the ring 38 and the spring 40 in order to reduce friction. The other end of the spring 40 rests upon a shoulder of the screw bushing 30 which in turn rests upon a nose of part 31 by the interposition of balls 43. Furthermore the screw bushing 30 is provided with two longitudinal slots 44 situated in the plane of projection of Fig. 5 through which are inserted the inwardly bent parts of an element 45 which has the shape of a flanged sleeve and is attached to the end of the threaded bolt 29 by means of a bushing 46 so that it is driven by the bolt in the axial direction.

The bushings 35 which are fluted at the outside may be covered by pivoting lids 47 which are attached to the casing 6 in a detachable manner by the hinge 49 which is provided with a slot parallel to the hinge bolt 48. The bolt is flattened on two opposite sides so that the lid, when opened, may be drawn off the hinge bolt (see Fig. 2). The hinge 49 is provided with a cam 50 which presses on a nest of leaf springs 51 when the lid 47 is closed. The outermost spring of the nest 51 is provided with a stop 52 which keeps the lid 47 shut by means of the cam 50. On the other hand the nest of springs 51 exerts pressure on the above-mentioned bolt 28 which thereby is pressed into the slot 27 of the spindle 26, thus preventing any displacement of the spindle 26.

The casing 6 contains a window 53 which makes the observation of the contact elements 24 and the contact surfaces 25 possible. An electric cable (not shown) is brought into the casing 6 through an outlet 54. This cable contains at least three conductors, one of which is connected to the mass of the device, thus being connected with the contact lever 11 and ground while each of the two remaining conductors is connected to one of the contact surfaces 25 which are insulated from the mass of the device and ground. The casing 6 may be provided with a multi-pole contact plug for the connection of the cable. If necessary, a cover 55 may be screwed off and a dial micrometer (not shown) can be attached to the upper side of the casing 6; the gauging pin of this micrometer would abut against the upper stop 23 of the gauging pin 7, so that displacements of the gauging pin 7 produced by the object to be measured could be read accurately on the dial micrometer. The functioning of the comparator as described in the preceding parts is as follows:

If a work piece to be measured is inserted between the surface of support 3 and the gauging element 8, the gauging pin 7 will move upwards according to the dimensions of the work-piece, against the action of the spring 9, so that the stop 23 will release the contact lever 11. The tension spring 21 now causes the lever 11 to pivot until, if occasion arises, the latter's upper element of contact 24 is stopped by the upper contact surface 25. If the gauging pin 7 is pressed further upwards, the stop 23 is lifted off the stop surface 22 of the contact lever 11, thus preventing any further stress on the contact lever. If the work-piece to be measured is taken out of the comparator, the gauging pin 7 will come to rest again under the influence of the spring 9, at the same time pivoting back the contact lever 11 by means of the stop 23.

To use the comparator, the height of the contact surface 25 must be adjusted in such a manner that an object, the dimensions of which are between the permissible limits, lifts the lower contact element 24 of the contact lever 11 from the lower contact surface 25 but does not move the upper contact element 24 as far as the upper contact surface 25. An object to be measured, the dimensions of which are at the upper permissible limit, must just close the upper gauging contact formed by the upper contact element 24 and the upper contact surface 25 whereas an object to be measured, the dimensions of which are at the lower permissible limit, just must not be able to open the lower gauging contact.

The correct adjustment of the contact surfaces 25 is effected by turning the corresponding bushing 35 whereby the balls 33 are rolled on the rings 37 and 38 by means of the pin 34 thus turning the screw bush 30 with considerable leverage. This makes the spindle 26 move upwards or downwards according to the direction of rotation of the bushing 35. The arrangement for the transmission of motion as described hereinbefore thus operates as a planetary gear rotating entirely without clearance, because the rings 37 and 38 are pressed permanently one against another by means of the spring 40, so that the balls 33 tend to yield inwards, thus adhering to the pin 34. The leverage between the bushings 35 and 30 is given by the inclination of the conical surfaces of the rings 37 and 38, by the size of the balls 33 and by the diameter of the pin 34. The bush-shaped element 45 also moves upwards or downwards when the spindle is rotated. It may be observed through a cut in part 31 when the lid 47 is opened so that the operator adjusting the comparator can watch the effect and above all, the direction of the displacement of the spindle 26 caused by the rotation of the bushing 35 by the observation of this element 45 which moves parallel to the corresponding contact surface 25.

If an object is taken out of the comparator very quickly the gauging pin 7 would snap downwards; it might then, after having closed the lower gauging contact, damage the bearing of the contact lever, especially the seat of the bearing. Any such damage, however, is prevented by the resilience of the seats 17 arranged in part 14 as any overload will make the springs yield.

The seat 16 is given a cylindrical instead of a conical form because thus the accuracy of manufacture of the bearings need not be so high. If the seat 16 were also provided with a conical bearing surface the slightest difference in distance of the two seats of lever 11 and of part 14 would wedge in the balls, thus hindering the pivoting of the contact lever 11 and rendering any exact adjustment of the gauge contact illusory.

The leverage of the contact lever 11 of the comparator described hereinbefore is kept comparatively low in order to prevent inaccurate movements so that, with the small permissible limits to be measured, movement of the contact elements 24 will also be small. However, the accuracy of switching and the stability of the gauging contacts can be made extraordinarily high by the use of hard metal contacts with lapped surfaces and by the use of small electrical voltages. Such a comparator offers great advantages compared with one as known hitherto mainly by the large range of adjustment of the tolerance limits which were between 1 and several millimeters and infinitely adjustable. Accordingly, there has been described a comparator for gauging geometrical dimensions of work pieces comprising gauging pin means, spring support means therefor, adjustable contact means provided with contact surfaces and coacting with said pin means to indicate whether dimensions of work pieces are within a predetermined permissible limit, lever means provided with contact elements, biasing means for urging said lever means to one position, said lever means being displaceable between said contact surfaces to thereby afford engagement of said contact elements with said contact surfaces when said lever means is in another position, said lever means including means operatively connecting said lever means to said pin means, said operatively connecting means including disengageable means intermediate said lever means and said pin means, and spring-urged bearing means forming a fulcrum for said lever means, whereby upon displacement of said pin means in opposition to the force exerted by said spring support means, said operatively connecting means permits pivoting of said lever means about said fulcrum until one of said contact surfaces is engaged by one of said contact elements so that said disengageable means disconnects said lever means from said gauging pin means, whereby said spring-urged bearing means yields and said fulcrum is displaced thereby in order to prevent damaging of said contact surfaces, of said contact elements and of said bearing means.

While the preferred embodiment of the invention has been shown and herein described, it will be understood that the same is capable of modification without departure from the general scope and spirit of the invention as defined in the claims.

What I claim and wish to secure by Letters Patent is:

1. A comparator for gauging geometrical dimensions of work pieces comprising gauging pin means, spring support means therefor, adjustable contact means provided with contact surfaces and coacting with said pin means to indicate whether dimensions of work pieces are within a predetermined permissible limit, lever means provided with contact elements, biasing means for urging said lever means to one position, said lever means being displaceable between said contact surfaces to thereby afford engagement of said contact elements with said contact surfaces when said lever means is in another position, said lever means including means operatively connecting said lever means to said pin means, said operatively connecting means including disengageable means intermediate said lever means and said pin means, and spring-urged bearing means forming a fulcrum for said lever means, whereby upon displacement of said pin means in opposition to the force exerted by said spring support means, said operatively connecting means permits pivoting of said lever means about said fulcrum until one of said contact surfaces is engaged by one of said contact elements so that said disengageable means disconnects said lever means from said gauging pin means, whereby said spring-urged bearing means yields and said fulcrum is displaced thereby in order to prevent damaging of said contact surfaces of said contact elements and of said bearing means.

2. A comparator according to claim 1, wherein said adjustable contact means includes axially displaceable screw-threaded spindle means, sleeve means threadedly connected to said spindle means, and drive means for rotating said sleeve means and for axially displacing said spindle means, said drive means including motion reduction means for translating a relatively large displacement of said drive means into a relatively small displacement of said sleeve means.

3. A comparator according to claim 2, wherein said drive means is provided with a pin projecting within said sleeve, said sleeve being provided with a plurality of rings having opposed tapered surfaces, said motion reduction means including ball means engageable between said tapered surfaces of said rings and of said pin.

4. A comparator according to claim 3, wherein one of said rings is displaceable, and spring means between said sleeve and said one ring for urging the latter into bearing engagement with said ball means.

5. A comparator according to claim 1, wherein said adjustable contact means includes axially displaceable screw-threaded spindle means provided with at least one groove, sleeve means threadedly connected to said spindle means, and drive means for rotating said sleeve means and axially displacing said spindle means, said drive means including bolt means engageable within said groove, spring means urging said bolt means into engagement with said groove, and movable lid means enclosing said drive means and engageable with said spring means upon movement of said lid means to closed position to thereby retain said bolt means in engagement with said groove and to lock said spindle means against displacement.

6. A comparator according to claim 5, wherein said lid means are each provided with cam means for securing said lid means into said closed position.

References Cited in the file of this patent
UNITED STATES PATENTS

| Number | Name | Date |
|---|---|---|
| 1,274,331 | Rockwell | July 30, 1918 |
| 2,403,285 | Jackman | July 2, 1946 |
| 2,431,099 | Wiseman | Nov. 18, 1947 |
| 2,433,585 | Warner | Dec. 30, 1947 |
| 2,497,199 | Aller | Feb. 14, 1950 |
| 2,497,564 | Sorg | Feb. 14, 1950 |
| 2,579,569 | Hauck et al. | Dec. 25, 1951 |
| 2,581,264 | Levesque | Jan. 1, 1952 |

FOREIGN PATENTS

| Number | Country | Date |
|---|---|---|
| 340,492 | Germany | Sept. 14, 1921 |
| 843,506 | France | Mar. 27, 1939 |
| 872,134 | France | Jan. 29, 1942 |
| 566,567 | Great Britain | Jan. 4, 1945 |